(12) United States Patent
Henry et al.

(10) Patent No.: US 9,830,727 B2
(45) Date of Patent: Nov. 28, 2017

(54) PERSONALIZING IMAGE CAPTURE

(71) Applicant: Google Inc., Mountain View, CA (US)

(72) Inventors: Damien Henry, Malakoff (FR);
Murphy Stein, Redwood City, CA (US)

(73) Assignee: Google Inc., Mountain View, CA (US)

( * ) Notice: Subject to any disclaimer, the term of this patent is extended or adjusted under 35 U.S.C. 154(b) by 98 days.

(21) Appl. No.: 14/813,376

(22) Filed: Jul. 30, 2015

(65) Prior Publication Data
US 2017/0032178 A1    Feb. 2, 2017

(51) Int. Cl.
*G06T 11/60*    (2006.01)
*G06K 9/00*    (2006.01)
*G06K 9/03*    (2006.01)

(52) U.S. Cl.
CPC .......... *G06T 11/60* (2013.01); *G06K 9/00308* (2013.01); *G06K 9/00677* (2013.01); *G06K 9/036* (2013.01)

(58) Field of Classification Search
CPC ............ G06T 2207/30196; G06T 7/20; G06K 9/00604; G06K 9/0061; G06K 9/00617; G06K 9/00221; G06K 9/00261; G06K 9/00268; G06K 9/00288; G06K 9/00677; G06K 9/00295; G06K 9/00302; G06K 9/00308; A61B 5/1176; G06F 17/30793
USPC ........ 382/117, 115, 118, 278, 224, 181, 284, 382/172
See application file for complete search history.

(56) References Cited

U.S. PATENT DOCUMENTS

| | | | |
|---|---|---|---|
| 8,831,276 B2 | 9/2014 | Martinez et al. | |
| 8,958,662 B1* | 2/2015 | Grosz | G06T 3/4038 382/118 |
| 9,122,912 B1* | 9/2015 | Briskin | G06K 9/00677 |
| 2007/0201726 A1* | 8/2007 | Steinberg | G06K 9/00221 382/103 |
| 2012/0014560 A1* | 1/2012 | Obrador | G06K 9/00677 382/103 |
| 2012/0044384 A1* | 2/2012 | Shibagami | H04N 1/2112 348/231.99 |
| 2012/0300092 A1 | 11/2012 | Kim et al. | |
| 2013/0336599 A1* | 12/2013 | Richards | G06T 5/005 382/284 |

(Continued)

*Primary Examiner* — Andrew Moyer
*Assistant Examiner* — Narek Zohrabyan
(74) *Attorney, Agent, or Firm* — Fish & Richardson P.C.

(57) ABSTRACT

In some implementations, faces based on image data from a camera of a mobile device are detected and one or more of the detected faces are determined to correspond to one or more people in a set of people that are classified as being important to a user. In response to determining that one or more of the detected faces correspond to one or more people in the set of people that are classified as being important to the user, quality scores are determined for the one or more detected faces that are determined to correspond to one or more people that are classified as important to the user. Multiple images with the camera are captured based on the quality scores such that, for each face determined to correspond to a person that is classified as important to the user, at least one of the multiple images includes an image of the face having at least a minimum quality score. A composite image is generated that combines the multiple images.

19 Claims, 5 Drawing Sheets

(56) References Cited

U.S. PATENT DOCUMENTS

| | | | |
|---|---|---|---|
| 2014/0153832 A1* | 6/2014 | Kwatra | G06T 11/00 382/195 |
| 2015/0015735 A1* | 1/2015 | Rav-Acha | H04N 5/23219 348/222.1 |
| 2015/0117786 A1* | 4/2015 | James | G06F 17/3028 382/195 |
| 2015/0281566 A1* | 10/2015 | Rav-Acha | H04N 5/23219 348/222.1 |
| 2016/0098852 A1* | 4/2016 | Senda | H04N 5/247 382/195 |

* cited by examiner

PERSONALIZING IMAGE CAPTURE

FIELD

This specification describes technologies related to image capture.

BACKGROUND

Images may be captured by cameras. For example, a mobile device including a camera may capture an image of a group of people.

SUMMARY

An image capturing system may use information about people that are important to a user to capture images for the user. For example, the image capturing system may capture multiple images of people that are important to the user to generate a composite image where an appearance of all the people that are important to a user are smiling, even if people who are less important to the user are not smiling. In capturing images for a user, the image capturing system may identify people that are important to the user. For example, the image capturing system may analyze a user's contact list on a mobile device and determine that "John Doe" and "Jane Doe" are important to the user because the user frequently communicates with them.

When capturing images, the image capturing system may detect faces in image data and determine that faces detected in the image data correspond to people that are important to the user. For example, the image capturing system may determine that image data representing a current view of a camera includes three faces, and that two of the faces correspond to "John Doe" and "Jane Doe," who were determined to be important to the user. The image capturing system may capture images of the three faces until the system captures at least one image where an appearance of the face of "John Doe" satisfies a quality threshold and at least one image where an appearance of the face of "Jane Doe" satisfies the quality threshold. For example, the image capturing system may capture images of the three faces until "John Doe" is smiling in at least one image and "Jane Doe" is smiling in at least one image.

In some implementations, the image capturing system monitors incoming image data from the camera, e.g., a live image feed, and sets the timing of the image capture based on determinations of when face images of the important people have at least a threshold level of quality. For example, the image capturing system may determine that the face image of one important person satisfies a quality threshold, and may trigger image capture in response so that a face image having the desired quality level is captured. Then, the image capturing system may monitor incoming image data until a face image of a second important person is determined to satisfy a quality threshold, and trigger the capture of another image when the face image for the second important person is determined to satisfy the quality threshold. The image capturing system may keep track of which of the important people have had acceptable face images captured, and which have not. When the image capturing system determines that a face image having the desired quality level has been captured for each important person in the camera view, the image capturing system may stop capturing images, even if high-quality face images have not been captured for other people appearing the camera view who are not classified as being important to the user.

The image capturing system may generate a composite image based on the captured images. For example, the image capturing system may combine portions of the images where the people that are important to the user are smiling and generate a single composite image where all the people that are important to the user are smiling.

In a general aspect, a method performed by data processing apparatus includes detecting one or more faces based on image data from a camera of a mobile device and determining that one or more of the detected faces correspond to one or more people in a set of people that are classified as being important to a user. The method includes, in response to determining that one or more of the detected faces correspond to one or more people in the set of people that are classified as being important to the user, determining quality scores for the one or more detected faces that are determined to correspond to one or more people that are classified as important to the user. The method includes capturing multiple images with the camera based on the quality scores such that, for each face determined to correspond to a person that is classified as important to the user, at least one of the multiple images includes an image of the face having at least a minimum quality score. The method includes generating a composite image that combines the multiple images.

Other implementations of this and other aspects include corresponding systems, apparatus, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue of having instructions that, when executed by data processing apparatus, cause the apparatus to perform the actions.

Implementations may include one or more of the following features. For instance, capturing multiple images includes determining that an image having at least the minimum quality score has not been captured for a particular identified face corresponding to a person classified as important to the user; waiting until the quality score for the particular identified face satisfies a threshold; and capturing an image in response to determining that the quality score for the particular identified face satisfies the threshold.

Implementations may include one or more of the following features. For instance, each of the multiple images is captured in response to determining that at least one of the identified faces has a quality score that satisfies a threshold. For instance, capturing multiple images includes capturing images until a face image having at least the minimum quality level has been captured for each of the identified faces; and determining to stop capturing images in response to determining that a high-quality image has been captured for each of the identified faces. For instance, capturing multiple images with the camera based on the quality scores such that, for each face determined to correspond to a person that is classified as important to the user, at least one of the multiple images includes an image of the face having at least a minimum quality score includes stopping image capture before the captured images include a face image having at least the minimum quality score for all people in view of the camera.

Implementations may include one or more of the following features. For instance, determining that one or more of the detected faces correspond to one or more people in a set of people that are classified as being important to a user includes obtaining data indicating facial features of people in the set of people that are classified as being important to the user; and determining that the facial features of the one or more people in the set of people match facial features of the one or more detected faces. The method may include obtaining a contact list of the user and selecting a subset of people in the contact list of the user to include in the set of people that are classified as being important to the user. The method may include determining frequencies that people appear in one or more photo albums of the user, determining frequencies that the user communicates with people, determining context data of the user representing a current location of the user, and determining to include people in the set of people that are classified as being important to the user based on (i) the frequencies that people appear in one or more photo albums of the user, (ii) the frequencies that the user communicates with people, and (iii) the context data of the user representing the current location of the user.

Implementations may include one or more of the following features. For instance, determining quality scores for the one or more detected faces that are determined to correspond to one or more people that are classified as important to the user includes determining whether the one or more detected faces are associated with a sharpness measure that does not satisfy a sharpness threshold or not smiling and determining quality scores for the one or more detected faces that are determined to correspond to one or more people that are classified as important to the user based on whether the one or more detected faces appear blurry or not smiling.

Implementations may include one or more of the following features. For instance, generating a composite image that combines the multiple images includes determining, for each of the detected faces that are determined to correspond to one or more people that are classified as important to the user, an image of the multiple images in which the face has a highest quality score and generating the composite image based on combining an appearance of the detected faces in the images in which the detected faces have the highest quality score. The method may include providing a graphical user interface indicating the detected faces that are determined to correspond to the one or more people in the set of people that are classified as being important to the user. The method may include providing a graphical user interface indicating the detected faces (i) that are determined to correspond to the one or more people in the set of people that are classified as being important to the user and (ii) that none of the captured multiple images have at least the minimum quality score.

In a general aspect, a method performed by data processing apparatus includes detecting one or more faces based on image data from a camera of a mobile device associated with a user, determining that a detected face corresponds to a person of interest to the user, in response to determining that the detected face corresponds to a person of interest, calculating one or more quality scores for the detected face corresponding to the person of interest until a calculated quality score satisfies a threshold, and capturing an image in response to determining that the calculated quality score for the detected face corresponding to the person of interest satisfies the threshold.

Implementations may include one or more of the following features. For instance, determining that a detected face corresponds to a person of interest to the user includes obtaining data indicating facial features of the person of interest to the user and determining that the facial features of the person of interest to the user matches facial features of the detected face. The method may include obtaining a contact list of the user and selecting the person of interest from the contact list. The method may include determining frequencies that people appear in one or more photo albums of the user, determining frequencies that the user communicates with people, determining context data of the user representing a current location of the user, and selecting the person of interest based on (i) the frequencies that people appear in one or more photo albums of the user, (ii) the frequencies that the user communicates with people, and (iii) the context data of the user representing the current location of the user.

Implementations may include one or more of the following features. For instance, calculating one or more quality scores for the detected face corresponding to the person of interest until a calculated quality score satisfies a threshold includes determining a measure of similarity between the detected face of the person of interest to the user and a profile photo of the person of interest to the user. Implementations may include one or more of the following features. For instance, calculating one or more quality scores for the detected face corresponding to the person of interest until a calculated quality score satisfies a threshold includes determining whether the detected face is associated with a sharpness measure that does not satisfy a sharpness threshold or not smiling and determining quality scores for the detected face that are determined based on whether the detected face is associated with a sharpness measure that does not satisfy the sharpness threshold or not smiling.

The details of one or more embodiments of the subject matter described in this specification are set forth in the accompanying drawings and the description below. Other potential features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
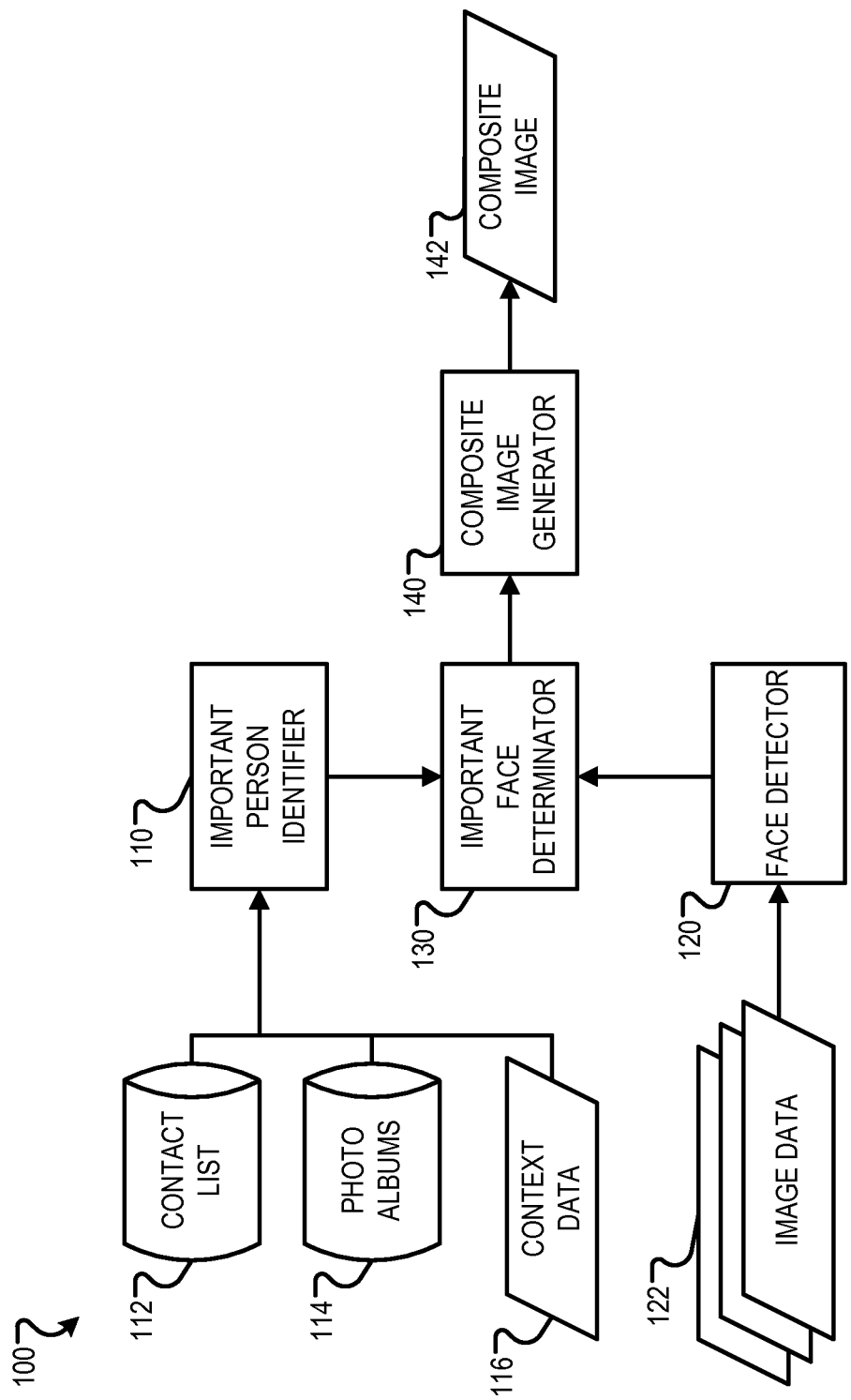
FIG. 1 is a block diagram that illustrates an example of a system for personalizing image capture.

FIG. 1 is a block diagram that illustrates an example of a system 100 for personalizing image capture. The system 100 may be implemented on a mobile computing device that includes a camera. For example, a mobile computing device may be a phone, a smartphone, a digital camera, a tablet computer, or some other computing device.

The image capture system 100 may enhance an ability of a mobile computing device to take pictures of groups of people. A user can enable a "group picture mode" that can help ensure that the people that the user cares most about look good in a final image. For example, for pictures of a class of school children, there will be many faces and the children may be moving. It is unlikely that a good image of every child's face can be captured in a limited amount of time. A parent may care most about the appearance of his or her own children. Accordingly, the system 100 can prioritize image capture so that a user's children or friends and family have high-quality face images, even if other people do not. This results in a personalized image capture process where devices taking pictures of the same group of people will produce different outputs as they prioritize different faces in the group The system 100 includes an important person identifier 110, a face detector 120, an important face identifier 130, and a composite image generator 140. These components may be implemented in software and/or hardware of the mobile computing device.

In the example, an important person identifier 110 identifies a set of people to be designated as being important to a user of the mobile computing device. The face detector 120 detects faces that are in view of a camera of the mobile computing device. The important face identifier 130 receives (i) data that identifies a set of people important to a user from the important person identifier 110 and (ii) data indicating faces detected by the face detector 120. The important face identifier 130 determines whether any of the detected faces correspond to any of the people important to the user. When detected faces are determined to correspond to people that are important to the user, the important face identifier 130 instructs the composite image generator 140 to capture images until an appearance of each of the detected faces that correspond to people that are important to the user satisfies a quality threshold. The composite image generator 140 then generates a composite image 142 based on the multiple images.

The important person identifier 110 may determine a set of people that are designated or classified as being important to a user. For example, the important person identifier 110 may determine that "John Doe" and "Jane Doe" are important to the user. The important person identifier 110 may determine the set of people that are important to the user based on one or more of the contact list 112, the photo albums 114, the context data 116, or other information.

The contact list 112 may be a list of contact information for people. Contact information may include, for example, a name of a person, a telephone number of the person, an e-mail address of the person, a physical address of the person, or other information that identifies a person or a means to contact the person. The contact list 112 may additionally or alternatively include a history of previous communications between the user and people. For example, the contact list 112 may indicate when previous phone calls, text messages, or e-mails were sent between the user and another person. In some implementations, the contact list 112 may additionally or alternative indicate a frequency of communications between the user and other people. For example, the contact list 112 may indicate that the user has sent two text messages a day to a specific person for the last month.

The photo albums 114 may be one or more photos associated with the user. For example the photo albums 114 may be photos stored on the mobile device of the user or photos stored in an account of the user on a social network. The context data 116 may be data that indicates a current context of the mobile computing device. For example, the context data 116 may indicate a current location of the user, a time of day, a day of the week, or other current context information. The context data 116 may include a current location determined by a global positioning system (GPS) sensor of a mobile device or a current time determined by a mobile device.

The important person identifier 110 may access data from one or more of the contact list 112, the photo albums 114, and the context data 116 and determine a set of people that are important to the user. In some implementations, the important person identifier 110 may determine how frequently the user communicates with people in the contact list 112, and identify people that most frequently communicate with the user as the people that are important to the user. For example, the important person identifier 110 may determine that out of a contact list of fifty people, a predetermined number, e.g., two, four, ten, or some other number, of people that the user most frequently calls are "John Doe," "Jane Doe," "Jack Doe," and "Jill Doe," and in response, determine a set of people that are important to the user that only includes "John Doe," "Jane Doe," "Jack Doe," and "Jill Doe."

In some other implementations, the important person identifier 110 may determine a set of people that are important to the user based on selecting a percentage, e.g., 10%, 20%, 25%, of people that are in the contact list. For example, the important person identifier 110 may determine that the contact list 112 includes one hundred people and determine a set of people that are important to the user that just includes the top 20% of the people in the contact list 112 with which the user most frequently communicates. In some other implementations, the important person identifier 110 may determine a set of people that are important to the user includes all people in the contact list 112 regardless of the frequency that the user communicates with the people.

Additionally or alternatively, the important person identifier 110 may determine the set people that are important to the user based on a number of times the people appear in the photo albums 114. For example, the important person identifier 110 may determine a predetermined number, e.g., five, then, twenty, or predetermined percentage, e.g., 10%, 20%, 25%, of the users to include in the set of people that are important to the user based on a number of times that the people appear in the photo albums 114. The important person identifier 110 may determine the number of times that people appear in the photo albums 114 based on one or more of image recognition or metadata associated with the photo albums 114. For example, the important person identifier 110 may determine that "John Doe" appears in a particular photo from the photo album based on recognizing that a face in the particular photo matches a face of "John Doe," or based on metadata associated with the particular photo indicating that "John Doe" is in the particular photo.

Additionally or alternatively, the important person identifier 110 may determine the set of people that are important to the user based on the context data 116. Different sets of people may be classified as being important to the user at different times, based on the current location of the user, time of day, or other contextual factors. For example, the important person identifier 110 may determine a set of people including co-workers during work hours or while at work and determine a set of people including family members during non-work hours or while not at work.

In some implementations, the important person identifier 110 may determine the set of people that are important to the user based on a combination of one or more of the contact list 112, the photo albums 114, and the context data 116. For example, the important person identifier 110 may determine that the user occasionally communicates with a person based on the contact list 112, has a few photos of the person in the photo album 114, and the person is a coworker and it is during work hours, and in response, determine that the person is important to the user. Although one single factor may not indicate that the person is important, the combination of factors may indicate that the person is important. The important person identifier 110 may apply weights to various measures, such as a number of photos that include the person, a number or frequency of calls or messages, and so on to generate an importance score for a person given the current context. People may be ranked according to their respective importance scores, and the people having scores indicating the highest importance may be selected as the set of important people. When generating the importance scores, Measures may be weighted according to recency, e.g., with more recent interactions given higher weight than older interactions. Similarly, the measures may be weight based on an extent or closeness of an interaction, e.g., with longer communications given more weight than shorter communications.

The important person identifier 110 may determine the set of people before the user indicates that the user would like to capture an image. For example, the important person identifier 110 may determine the set of people that are important to the user when the user adds a person to the contact list 112, removes a person from the contact list 112, communicates with a person in the contact list 112, adds a photo of a person to the photo albums 114, removes a photo of a person from the photo albums 114, or the context data 116 changes. The set of people may be updated periodically, for example, daily or weekly. Alternatively, the important person identifier 110 may dynamically determine the set of people that are important to the user in response to determining that the user desires to capture a photo. For example, the important person identifier 110 may determine that the user has opened a photo capturing application or mode on a mobile device, and in response, obtain one or more of the contact list 112, photo albums 114, or context data 116 and determine the set of people that are important to the user.

The important person identifier 110 may provide the set of people that are important to the user to the important face identifier 130. For example, the important person identifier 110 may provide a list of "John Doe" and "Jane Doe" as a set of people that are important to the user to the important face identifier 130. If the set of people is determined in advance, the important person identifier 110 may store data at the mobile computing device that identifies the people in the set. For example, the contact list entry for a person may be marked to indicate whether the person is in the set.

When the user of the mobile computing device opens a camera application or other image capture mode, the mobile computing device receives image data 122 from the camera sensor. In some instances, this image data 122 is a series of images provided as a stream or feed of image frames similar to a video, e.g., at 10 frames per second, 20 frames per second, etc. The images in the image data 122 are often obtained substantially in real-time with small processing delays, so the most recent frame from the image data 122 represents the current scene in view of the camera. Often, the image data 122 is displayed on a screen of the mobile computing device to show the user what is within view of the camera.

The face detector 120 receives the image data 122 and may detect faces in the image data 122. For example, the face detector 120 may detect that image data 122 representing a current view of a camera of a mobile device includes no faces, one face, two faces, or some other number of faces. The image data 122 represents data from a view of a camera of a mobile device. For example, the image data 122 may represent frames or sets of pixels generated by the camera of the mobile device, where each frame or set of pixels represents a view of the camera at a particular time. The face detector 120 may detect faces in the image data 122 based on face detection processing. For example, the face detector 120 may detect faces in the image data 122 by identifying groups of pixels that appear to represent two eyes, a nose, and a mouth with certain spatial relationships that are characteristic of faces. The face detector 120 may provide the image data 122 and indications of the detected faces to the important face identifier 130. For example, the indications of the detected faces may indicate areas where detected faces are located.

The important face identifier 130 determines whether any identified faces correspond to people classified as being important to the user. To do this, the important face identifier 130 may access (i) data that indicates the set of people that are important to the user, as determined by the important person identifier 110, (ii) the image data 122, and (iii) the indications of the detected faces from the face detector 120. For example, the important face identifier 130 may obtain a list of people including "John Doe" and "Jane Doe" from the important person identifier 110, and obtain image data representing a current view of a camera that includes "John Doe," "Jane Doe," and "Mary Major" and indications of the location of the three detected faces in the image from the face detector 120.

The important face identifier 130 may determine whether one or more of the detected faces correspond to one or more people of the set of people that are important to the user. For example, the important face identifier 130 may determine, for each of the three detected faces in the image data 122, whether the face is the face of "John Doe," "Jane Doe," or another person in the set of people that classified as being important to the user.

The important face identifier 130 may use facial recognition to identify which of the detected faces correspond to people in the set of people that are important to the user. For example, the important face identifier 130 may obtain data indicating facial features of the different people that are important to the user, determine whether the facial features match facial features of any of the detected faces, and in response to determining a match, determine that the detected face corresponds to the person in the set of people that are important to the user. In another example, the important face identifier 130 may attempt to determine an identity of each of the detected faces, determine whether any of the determined identities match any person in the set of people that are important to the user, in response to determining a match, determine the detected face corresponding to the identity corresponds to the person in the set of people that are important to the user.

In response to determining that one or more of the detected faces do correspond to one or more people of the set of people that are important to the user, the important face identifier 130 may provide the composite image generator 140 identities of the people corresponding to the detected important faces in an image, the image data, and information indicating where the important faces are in the image represented by the image data. An important face may refer to a face that belongs to a person in a set of people that are important to the user. For example, the important face identifier 130 may determine to provide the composite image generator 140 a current view of a camera of a mobile device showing "John Doe," "Jane Doe," and "Mary Major" and information indicating that an important face of "John Doe" is on the right of the image and an important face of "Jane Doe" is in the middle of the image.

When the user of the mobile computing device is ready to take a photograph, the user presses a shutter button or other control to initiate the capture of a photograph. Instead of capturing a single photograph, the mobile computing device can use a "group photo" capture mode that captures multiple still photographs and combines them to produce a higher-quality photograph than any of the individual images captured. The still images can be captured in a manner that is prioritized so that high-quality still images of the important people are captured, even if not every person in view of the camera has a high-quality face image. In some implementations, the important face identifier 130 has already identified which faces, if any, correspond to important people when the user initiates image capture. The "group photo" capture mode may be explicitly selected by the user, or may be used automatically by the mobile computing device in response to, for example, detecting at least a minimum number of faces or determining that one or more important people are in view of the camera.

The composite image generator 140 determines when to capture images and how many images to capture, and then combines the images into a single composite image 142. The composite image generator 140 may use information from the important face identifier 130, such as indications of which faces correspond to important people, to generate the composite image 142. For example, the composite image generator 140 may capture a series of images including one image when "John Doe" is smiling and "Jane Doe" and "Mary Major" are not smiling and another image when "Jane Doe" is smiling and "John Doe" and "Mary Major" are not smiling, obtain information indicating that "John Doe" is on the right of the image and "Jane Doe" is in the middle of the image, and generate, from the image data, a composite image where both "John Doe" and "Jane Doe" are smiling and "Mary Major" is not smiling.

The composite image generator 140 may determine when to capture images and how many images to capture based on determining quality scores for detected important faces. The quality score may be a metric reflecting a quality of an appearance of the face. For example, the composite image generator 140 may generate a quality score of 0.3 for face of "John Doe" in an image where "John Doe" has his eye's closed and generate a quality score of 0.9 for a face of "John Doe" in an image where "John Doe" has his eyes opened and is smiling. The quality scores can be updated as additional frames of the image data 122 are received, to dynamically reflect the quality of face images currently in view of the camera.

The composite image generator 140 may determine quality scores for detected important faces based on determining a similarity between an important person's profile photo and an appearance of the important face in an image. For example, the composite image generator 140 may obtain a profile photo from a social network profile account of "John Doe" and determine a visual similarity of the profile photo with an appearance of a face of "John Doe" in image data. The higher the similarity between the current view of the person's face and the profile photo, the higher the quality of the face image indicated by the quality score.

Additionally or alternatively, the composite image generator 140 may determine quality scores for detected important faces based on determining if the person is smiling or has opened eyes. For example, the composite image generator 140 may identify eyes and mouths of detected important faces and determine higher quality scores for images where the eyes are opened and mouths are smiling. Additionally or alternatively, the composite image generator 140 may determine quality scores based on blur or sharpness, pose, clarity, direction of gaze, and other factors. For example, the composite image generator 140 may determine higher quality scores for images with less blur, poses where a person's full body is visible, greater clarity, and where the direction of gaze is towards the camera.

The composite image generator 140 may capture multiple images with the camera based on the quality scores such that, for each face determined to correspond to a person that is classified as important to the user, at least one of the multiple images includes an image of the face having at least a minimum quality score, e.g., 0.5, 0.7, 0.9 or some other quality score. For example, the composite image generator 140 may capture a first image where a quality score for "John Doe" is 0.9, which is above a minimum quality score of 0.7, and a quality score for "Jane Doe" is 0.4, which is below a minimum quality score of 0.7, and a capture a second image a second later where a quality score for "John Doe" is 0.5, below a minimum quality score of 0.7, and a quality score for "Jane Doe" is 0.8, above a minimum quality score of 0.7. The image capture can be triggered based on when the quality score indicates at least the minimum quality level. For example, if a sufficiently high-quality photo of "Jane Doe" has not been captured in the current image capture sequence, the composite image generator 140 can wait until a quality score for "Jane Doe" reaches the minimum quality score level of 0.7, and then capture an image in response to the score reaching that level.

The composite image generator 140 may capture an image every time at least a quality score of one important face is above a minimum quality score when there is no other image where the quality score of the important face is above a minimum quality score. For example, the composite image generator 140 may initially capture an image where a quality score of "John Doe" is 0.8 above a minimum quality score of 0.7 and a quality score of "Jane Doe" is 0.3 below the minimum quality score of 0.7, and may not capture another image until a quality score of "Jane Doe" in image data corresponding to a current view is above the minimum quality score of 0.7.

Additionally or alternatively, the composite image generator 140 may capture an image every time at least a quality score of an important face is above a quality score of the important face in any other image. For example, the composite image generator 140 may initially capture an image where a quality score of "John Doe" is 0.8, above a minimum quality score of 0.7, and a quality score of "Jane Doe" is 0.3, below the minimum quality score of 0.7, and may capture another image where a quality score of "John Doe" is 0.9 and a quality score of "Jane Doe" is 0.3 still below the minimum quality score of 0.7.

The composite image generator 140 may determine to stop capturing images once, for each face determined to correspond to a person that is classified as important to the user, at least one of the multiple images includes an image of the face having at least a minimum quality score. For example, the composite image generator 140 may determine that for three important faces, a first important face has a quality score above the minimum quality score in a first image and a second and third important face have quality scores above the minimum quality score in a second image, and in response, determine to stop capturing images.

In some implementations, the composite image generator 140 may determine to stop capturing images once a predetermined amount of time has passed. For example, the composite image generator 140 may determine to stop capturing images after two seconds, three seconds, four seconds, or some other amount of time even if, for each face determined to correspond to a person that is classified as important to the user, at least one of the multiple images does not includes an image of the face having at least a minimum quality score.

After capturing the images, the composite image generator 140 may generate a composite image that combines the multiple images. For example, the composite image may generate a composite image based on using a first image where a quality score of "John Doe" satisfies a minimum quality score and replacing a face of "Jane Doe" in the first image with a face of "Jane Doe" in a second image where a quality score of "Jane Doe" satisfies a minimum quality score.

Additionally or alternatively, in generating composite images, the image generator 140 may determine the captured image in which a quality score of an important person is the highest and use the appearance of the person in that image in generating the composite image. For example, the image generator 140 may determine that "John Doe" has a quality score of 0.8 in a first image and 0.9 in a second image, and in response, determine to generate a composite image using in appearance of "John Doe" in the second image. In general, the composite image generator 140 may select the best face image, as indicated by a quality score, for each person in the captured images, whether the person is classified as important or not.

In some implementations, the composite image generator 140 may provide user interface indications to assist a user or provide feedback to the user. For example, before a user presses a shutter button, the important face identifier 130 may already determine that the user is taking a photo of multiple important faces based on determining multiple important faces are in a current view of a camera. In response, the composite image generator 140 may provide a square outline around each detected face that corresponds to an important person. Once the system 100 receives an indication that the user would like to capture an image, e.g., detecting a pressing of a shutter button, the system 100 may show a timer showing a time remaining that the system 100 will attempt to capture images for generating a composite image, and display a square outline around important faces for which no image data is yet available where a quality score for the important face is above a minimum quality score.

In some implementations, the composite image generator 140 may not generate a composite image or capture multiple images, but instead wait until a single moment when all important faces have a quality score that satisfies the minimum quality score and then capture a single image for that single moment. For example, the composite image generator 140 may wait to capture an image until both "John Doe" and "Jane Doe" and smiling, even if "Mary Major" is not smiling when the image is captured.

In some implementations, the important face determinator 130 may determine that a detected face in image data from a camera of a mobile device associated with a user corresponds to a person of interest to the user and may provide an indication to the composite image generator 140 that the image data includes the detected face of a person of interest to the user, the composite image generator 140 may receive the indication and in response, calculate one or more quality scores for the detected face corresponding to the person of interest until a calculated quality score satisfies a threshold, and capture an image in response to determining that the calculated quality score for the detected face corresponding to the person of interest satisfies the threshold.

For example, the important face determinator 130 may determine that a face of "John Doe" in image data from a camera of a mobile device associated with a user corresponds to a person of interest to the user and may provide an indication to the composite image generator 140 that the image data includes the detected face of "John Doe," the composite image generator 140 may receive the indication and in response, calculate a quality score of 0.3 as "John Doe" may have his eye's closed, determine that the quality score of 0.3 is below a threshold of 0.7, continue calculating quality scores and calculate a quality score of 0.5 as "John Doe" may have his eyes opened but may not be smiling, determine that the quality score of 0.5 is below the threshold of 0.7, continue calculating quality scores and calculate a quality score of 0.8 as "John Doe" may be smiling with his eyes open, determine that the quality score of 0.8 is above the threshold of 0.7, and in response to determining that the quality score of 0.8 is above the threshold of 0.7, capture the image. In some implementations, the mobile computing device generates quality scores for only the faces of people determined to be classified as important to the user. Similarly, the mobile computing device may begin generating the quality scores only as a result of determining that the faces correspond to important people.

In some implementations, in response to determining that one or more of the detected faces do not correspond to one or more people of the set of people that are important to the user, the important face identifier 130 may determine not to generate a composite image. For example, the important face identifier 130 may determine to capture a single image that corresponds to a view of the camera when the user triggers the mobile device to capture an image. Similarly, if a single image is captured that includes all important people with sufficiently high-quality faces, no additional image capture or image compositing may be necessary.

In situations in which the systems discussed here collect personal information about opportunity to control whether programs or features collect user information (e.g., information about a user's social network, social actions or activities, profession, a user's preferences, or a user's current location), or to control whether and/or how to receive content that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user.

Figure 2:
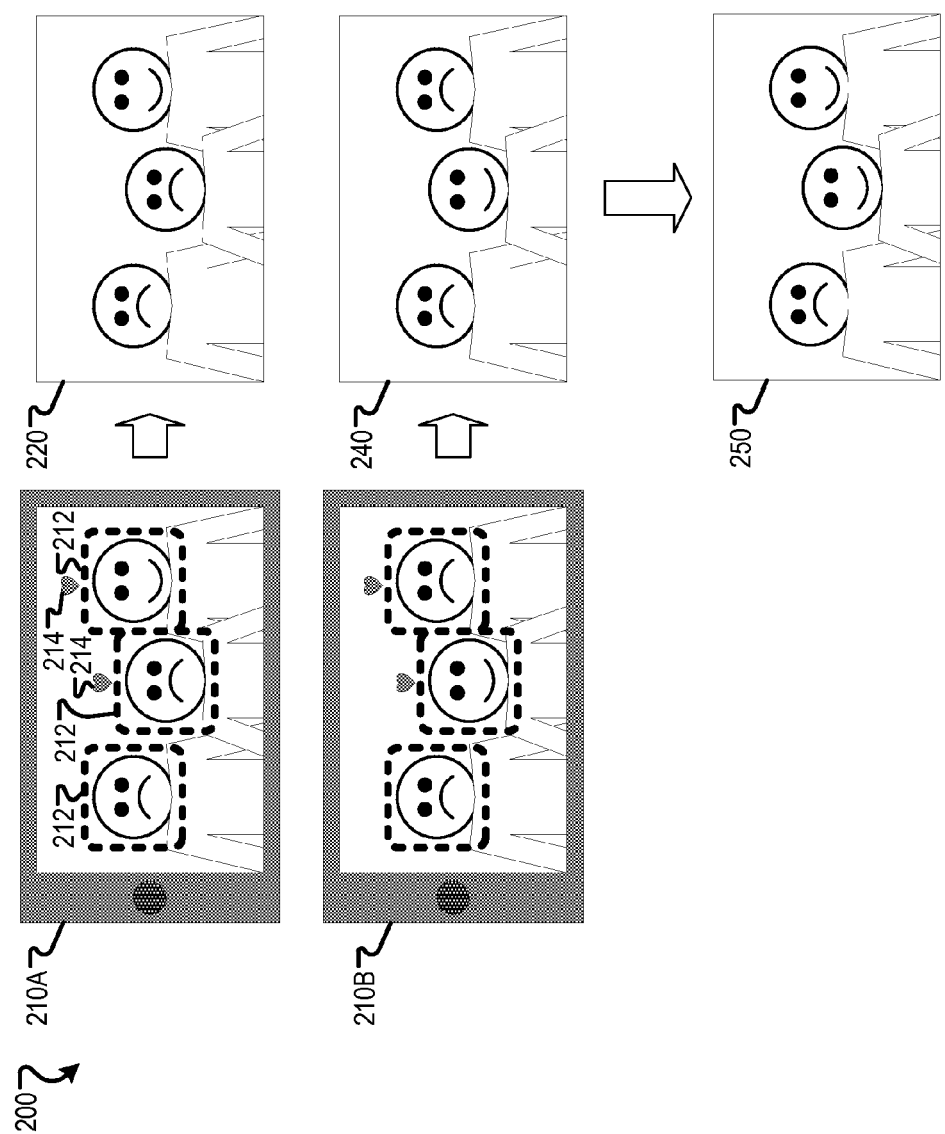
FIG. 2 is a diagram that illustrates an example generation of a composite image.

FIG. 2 is a diagram 200 that illustrates an example generation of a composite image. The diagram 200 shows a camera view of a mobile device 210A at a first instance in time where three faces are detected as shown by the outlines 212, and the middle and right most faces are indicated as being important faces as indicated by the heart symbols 214. The right-most face satisfies a minimum quality score, e.g., the face is smiling, so a first image 220 is captured. At a later point in time, a camera view of the mobile device 210B shows the middle face satisfies a minimum quality score, e.g., the face is smiling, so a second image 240 is captured even though the right-most face does not satisfy the minimum quality score in the second image 240. After the second image 240 is captured, for each important face, at least one image is captured where the quality score for the important face satisfies the minimum quality score and a composite image 250 is generated where both of the important faces satisfy the minimum quality score, e.g., the right-most face is taken from the first image 220 and the middle face is taken from the second image 240. As a result, each of the people designated as important to the user has at least the minimum level of quality, although not all of the faces in the final composite 250 do.

Figure 3A:
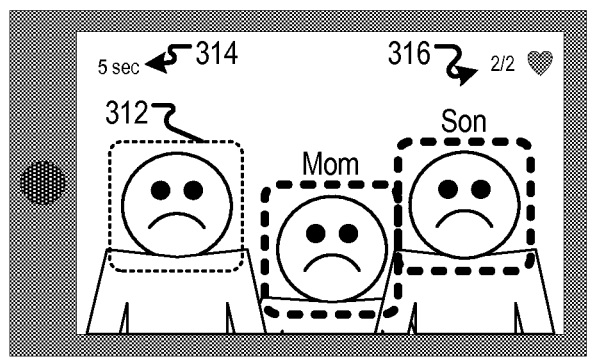
FIGS. 3A and 3B are diagrams that illustrate example user interfaces of a system for personalizing image capture.
Figure 3B:
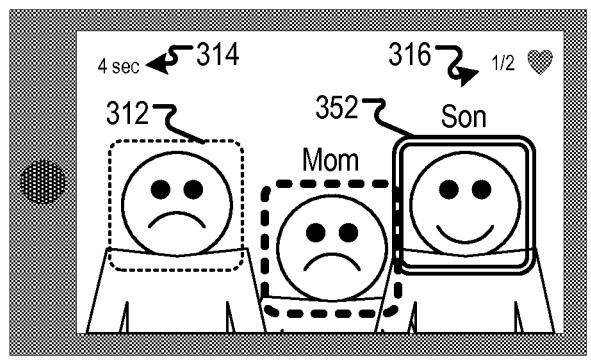

FIGS. 3A and 3B are diagrams that illustrate example user interfaces of a system for capturing images based on importance of people to a user. FIG. 3A shows how a timer 314 may be displayed in a user interface 310 showing a remaining amount of time, e.g., five seconds, that a mobile device may wait continue to capture images to use in generating a composite image, an indication showing a number of important faces in the image and a number of important faces for which an image with a quality score for that important user satisfying a minimum quality score is not available, e.g., "2/2." A detected face of a non-important person may be shown in an outline with a different appearance, e.g., fainter, different color, or different style, than an outline around detected important faces.

FIG. 3B shows a user interface 350 one second later when an important face is smiling and satisfies a minimum quality score, a timer may be decremented, e.g., shows four seconds, the indication may show two important faces and only one important face remaining that needs an image with a quality score for that face satisfying a minimum score, e.g., "1/2," and a different outline around the detected important face for which an image with a quality score for that face satisfies a minimum score.

Figure 4:
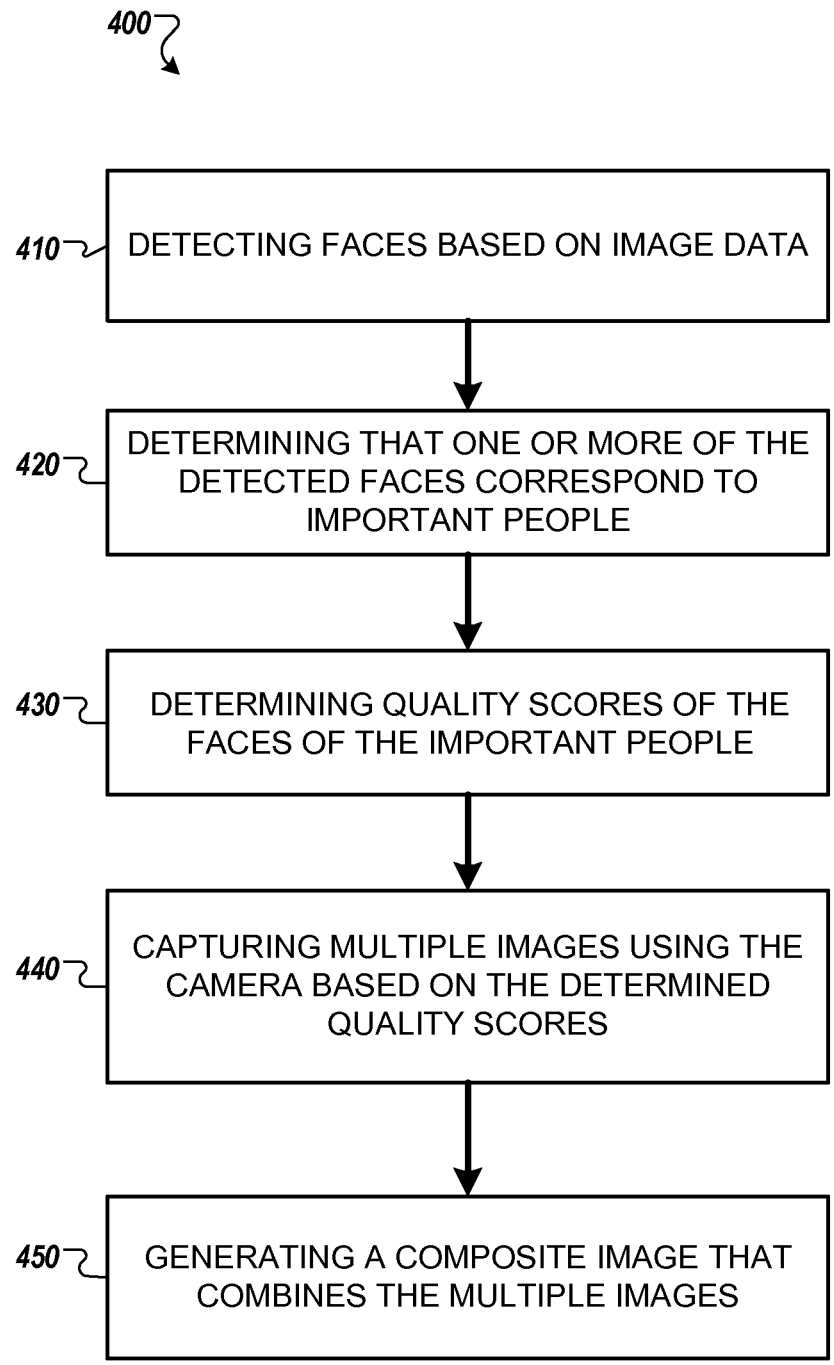
FIG. 4 is a flow diagram that illustrates an example of a process for personalizing image capture.

FIG. 4 is a flow diagram that illustrates an example of a process 410 for capturing images based on importance of people to a user. The operations of the process 400 may be performed by one or more computing systems, such as the system 100 of FIG. 1.

Faces are detected based on image data (410). For example, the face detector 120 may detect faces in image data, where the image data corresponds to a current view of a camera of a mobile device.

One or more of the detected faces are determined to correspond to important people (420). For example, the important face identifier 130 may determine that image data corresponding to a current view includes a face of "John Doe" and "Jane Doe," both of which are determined by the important person identifier 110 to be important to the user. In some cases, determining that one or more of the detected faces correspond to one or more people in a set of people that are classified as being important to a user includes obtaining data indicating facial features of people in the set of people that are classified as being important to the user and determining that the facial features of the one or more people in the set of people match facial features of the one or more detected faces.

Quality scores of the faces of the important people are determined (430). For example, the important face identifier 130 may determine that a quality score of "John Doe" in the image data is 0.3 as "John Doe" is yawning and a quality score of "Jane Doe" in the image data is 0.9 as "Jane Doe" is smiling and has her eyes open. In some cases, determining quality scores for the one or more detected faces that are determined to correspond to one or more people that are classified as important to the user includes determining a measure of similarity between a detected face of a person that is classified as important to the user and a profile photo of the person that is classified as important to the user. In some implementations, determining quality scores for the one or more detected faces that are determined to correspond to one or more people that are classified as important to the user includes determining whether the one or more detected faces are associated with a sharpness measure that does not satisfy a sharpness threshold or not smiling and determining quality scores for the one or more detected faces that are determined to correspond to one or more people that are classified as important to the user based on whether the one or more detected faces appear blurry or not smiling.

Multiple images are captured using the camera based on the determined quality scores (440). For example, the important face identifier 130 may continue to determine quality scores as a view of a camera changes and the composite image generator 140 may determine when to capture images based on the view of the camera including an important face where no captured image includes an appearance of the important face that satisfies a minimum quality score and determine to stop capturing images once, for each important face, at least one image is captured where a quality score for the important face is above a minimum quality score.

In some implementations, capturing multiple images includes determining that an image having at least the minimum quality score has not been captured for a particular identified face corresponding to a person classified as important to the user, waiting until the quality score for the particular identified face satisfies a threshold, and capturing an image in response to determining that the quality score for the particular identified face satisfies the threshold. In some cases, each of the multiple images is captured in response to determining that at least one of the identified faces has a quality score that satisfies a threshold. In some cases, capturing the multiple images includes capturing images until a face image having at least the minimum quality level has been captured for each of the identified faces and determining to stop capturing images in response to determining that a high-quality image has been captured for each of the identified faces. In some implementations, capturing multiple images with the camera based on the quality scores such that, for each face determined to correspond to a person that is classified as important to the user, at least one of the multiple images includes an image of the face having at least a minimum quality score includes stopping image capture before the captured images include a face image having at least the minimum quality score for all people in view of the camera.

A composite image that combines the multiple images may be generated (450). For example, the composite image generator 140 may generate the composite image by combining portions of the captured images where detected important faces satisfy the minimum quality score. In some cases, generating a composite image that combines the multiple images includes determining, for each of the detected faces that are determined to correspond to one or more people that are classified as important to the user, an image of the multiple images in which the face has a highest quality score and generating the composite image based on combining an appearance of the detected faces in the images in which the detected faces have the highest quality score.

In some implementations, the process 400 may include obtaining a contact list of the user and selecting a subset of people in the contact list of the user to include in the set of people that are classified as being important to the user. In some cases, the process 400 may include determining frequencies that people appear in one or more photo albums of the user, determining frequencies that the user communicates with people, determining context data of the user representing a current location of the user, and determining to include people in the set of people that are classified as being important to the user based on (i) the frequencies that people appear in one or more photo albums of the user, (ii)

the frequencies that the user communicates with people, and (iii) the context data of the user representing the current location of the user. In some implementations, the process 400 includes one or more of providing a graphical user interface indicating the detected faces that are determined to correspond to the one or more people in the set of people that are classified as being important to the user or providing a graphical user interface indicating the detected faces (i) that are determined to correspond to the one or more people in the set of people that are classified as being important to the user and (ii) that none of the captured multiple images have at least the minimum quality score.

Figure 5:
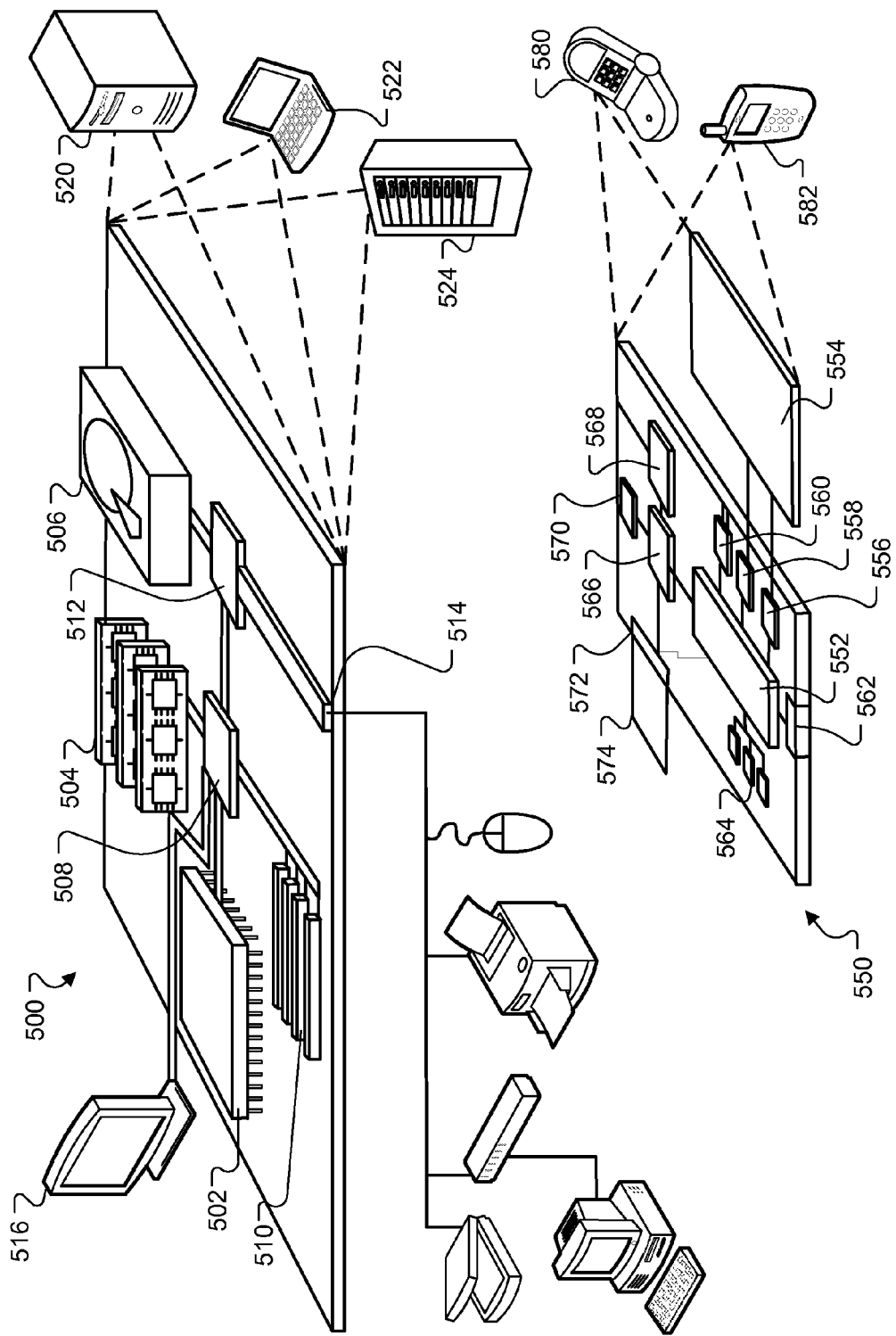
FIG. 5 is a diagram of examples of computing devices.

FIG. 5 shows an example of a computing device 500 and a mobile computing device 550 that can be used to implement the techniques described here. The computing device 500 is intended to represent various forms of digital computers, such as laptops, desktops, workstations, personal digital assistants, servers, blade servers, mainframes, and other appropriate computers. The mobile computing device 550 is intended to represent various forms of mobile devices, such as personal digital assistants, cellular telephones, smart-phones, and other similar computing devices. The components shown here, their connections and relationships, and their functions, are meant to be examples only, and are not meant to be limiting.

The computing device 500 includes a processor 502, a memory 504, a storage device 506, a high-speed interface 508 connecting to the memory 504 and multiple high-speed expansion ports 510, and a low-speed interface 512 connecting to a low-speed expansion port 514 and the storage device 506. Each of the processor 502, the memory 504, the storage device 506, the high-speed interface 508, the high-speed expansion ports 510, and the low-speed interface 512, are interconnected using various busses, and may be mounted on a common motherboard or in other manners as appropriate. The processor 502 can process instructions for execution within the computing device 500, including instructions stored in the memory 504 or on the storage device 506 to display graphical information for a graphical user interface (GUI) on an external input/output device, such as a display 516 coupled to the high-speed interface 508. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 504 stores information within the computing device 500. In some implementations, the memory 504 is a volatile memory unit or units. In some implementations, the memory 504 is a non-volatile memory unit or units. The memory 504 may also be another form of computer-readable medium, such as a magnetic or optical disk.

The storage device 506 is capable of providing mass storage for the computing device 500. In some implementations, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. Instructions can be stored in an information carrier. The instructions, when executed by one or more processing devices (for example, processor 502), perform one or more methods, such as those described above. The instructions can also be stored by one or more storage devices such as computer- or machine-readable mediums (for example, the memory 504, the storage device 506, or memory on the processor 502).

The high-speed interface 508 manages bandwidth-intensive operations for the computing device 500, while the low-speed interface 512 manages lower bandwidth-intensive operations. Such allocation of functions is an example only. In some implementations, the high-speed interface 508 is coupled to the memory 504, the display 516 (e.g., through a graphics processor or accelerator), and to the high-speed expansion ports 510, which may accept various expansion cards (not shown). In the implementation, the low-speed interface 512 is coupled to the storage device 506 and the low-speed expansion port 514. The low-speed expansion port 514, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. In addition, it may be implemented in a personal computer such as a laptop computer 522. It may also be implemented as part of a rack server system 524. Alternatively, components from the computing device 500 may be combined with other components in a mobile device (not shown), such as a mobile computing device 550. Each of such devices may contain one or more of the computing device 500 and the mobile computing device 550, and an entire system may be made up of multiple computing devices communicating with each other.

The mobile computing device 550 includes a processor 552, a memory 564, an input/output device such as a display 554, a communication interface 566, and a transceiver 568, among other components. The mobile computing device 550 may also be provided with a storage device, such as a micro-drive or other device, to provide additional storage. Each of the processor 552, the memory 564, the display 554, the communication interface 566, and the transceiver 568, are interconnected using various buses, and several of the components may be mounted on a common motherboard or in other manners as appropriate.

The processor 552 can execute instructions within the mobile computing device 550, including instructions stored in the memory 564. The processor 552 may be implemented as a chipset of chips that include separate and multiple analog and digital processors. The processor 552 may provide, for example, for coordination of the other components of the mobile computing device 550, such as control of user interfaces, applications run by the mobile computing device 550, and wireless communication by the mobile computing device 550.

The processor 552 may communicate with a user through a control interface 558 and a display interface 556 coupled to the display 554. The display 554 may be, for example, a TFT (Thin-Film-Transistor Liquid Crystal Display) display or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may provide communication with the processor 552, so as to enable near area communication of the mobile computing device 550 with other devices. The external interface 562 may provide, for example, for wired communication in some implementations, or for wireless communication in other implementations, and multiple interfaces may also be used.

The memory 564 stores information within the mobile computing device 550. The memory 564 can be implemented as one or more of a computer-readable medium or media, a volatile memory unit or units, or a non-volatile memory unit or units. An expansion memory 574 may also be provided and connected to the mobile computing device 550 through an expansion interface 572, which may include, for example, a SIMM (Single In Line Memory Module) card interface. The expansion memory 574 may provide extra storage space for the mobile computing device 550, or may also store applications or other information for the mobile computing device 550. Specifically, the expansion memory 574 may include instructions to carry out or supplement the processes described above, and may include secure information also. Thus, for example, the expansion memory 574 may be provided as a security module for the mobile computing device 550, and may be programmed with instructions that permit secure use of the mobile computing device 550. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. In some implementations, instructions are stored in an information carrier that the instructions, when executed by one or more processing devices (for example, processor 552), perform one or more methods, such as those described above. The instructions can also be stored by one or more storage devices, such as one or more computer- or machine-readable mediums (for example, the memory 564, the expansion memory 574, or memory on the processor 552). In some implementations, the instructions can be received in a propagated signal, for example, over the transceiver 568 or the external interface 562.

The mobile computing device 550 may communicate wirelessly through the communication interface 566, which may include digital signal processing circuitry where necessary. The communication interface 566 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 568 using a radio-frequency. In addition, short-range communication may occur, such as using a Bluetooth, WiFi, or other such transceiver (not shown). In addition, a GPS (Global Positioning System) receiver module 570 may provide additional navigation- and location-related wireless data to the mobile computing device 550, which may be used as appropriate by applications running on the mobile computing device 550.

The mobile computing device 550 may also communicate audibly using an audio codec 560, which may receive spoken information from a user and convert it to usable digital information. The audio codec 560 may likewise generate audible sound for a user, such as through a speaker, e.g., in a handset of the mobile computing device 550. Such sound may include sound from voice telephone calls, may include recorded sound (e.g., voice messages, music files, etc.) and may also include sound generated by applications operating on the mobile computing device 550.

The mobile computing device 550 may be implemented in a number of different forms, as shown in the figure. For example, it may be implemented as a cellular telephone 580. It may also be implemented as part of a smart-phone 582, personal digital assistant, or other similar mobile device.

What is claimed is:

1. A method performed by data processing apparatus, the method comprising:
    determining frequencies that a user communicates with people;
    detecting at least two faces based on image data in a live image feed of a camera of a mobile device;
    determining that the at least two detected faces correspond to at least two people, in a set of people, who are classified as being important to a user;
    in response to determining that at least two of the detected faces correspond to at least two people, in the set of people, who are classified as being important to the user based on the frequencies that the user communicates with people, determining one or more quality scores for the at least two detected faces that are determined to correspond to at least two people who are classified as important to the user;
    capturing multiple images of the detected faces corresponding to at least two people, in the set of people, who are classified as being important to the user with the camera based on the one or more quality scores, wherein the capturing is ended in response to determining, based on the one or more quality scores, that a face image having at least a minimum quality score has been captured for each of the people classified as being important; and
    generating a composite image that combines the multiple images of the detected faces corresponding to the at least two people, in the set of people, who are classified as being important to the user.

2. The method of claim 1, wherein capturing multiple images comprises:
    determining that an image having at least the minimum quality score has not been captured for a particular identified face corresponding to a person who is classified as important to the user;
    waiting until the one or more quality score for the particular identified face in the live image feed of a camera satisfies a threshold prior to capturing an additional image of the particular identified face; and
    capturing an additional image for the particular identified face in response to determining that the quality score for the particular identified face in the live image feed of the camera satisfies the threshold.

3. The method of claim 1, wherein each of the multiple images is captured in response to determining that at least one of the detected faces has a quality score that satisfies a threshold.

4. The method of claim 1, wherein capturing multiple images with the camera based on the one or more quality scores comprises:
    stopping image capture before the captured images include a face image having at least the minimum quality score for all people in view of the camera.

5. The method of claim 1, wherein determining that one or more of the detected faces correspond to one or more people, in a set of people, who are classified as being important to a user comprises:

obtaining data indicating facial features of people, in the set of people, who are classified as being important to the user; and determining that the facial features of the one or more people in the set of people match facial features of the one or more detected faces.

6. The method of claim 1, comprising:

obtaining a contact list of the user; and selecting a subset of people in the contact list of the user to include in the set of people who are classified as being important to the user.

7. The method of claim 1, comprising:

determining frequencies that people appear in one or more photo albums of the user;

determining context data of the user representing a current location of the user; and determining to include people, in the set of people, who are classified as being important to the user based on (i) the frequencies that people appear in one or more photo albums of the user, (ii) the frequencies that the user communicates with people, and (iii) the context data of the user representing the current location of the user.

8. The method of claim 1, wherein determining one or more quality scores for the one or more detected faces that are determined to correspond to one or more people who are classified as important to the user comprises:

determining a measure of similarity between a detected face of a person who is classified as important to the user and a profile photo of the person who is classified as important to the user.

9. The method of claim 1, wherein determining one or more quality scores for the one or more detected faces that are determined to correspond to one or more people who are classified as important to the user comprises:

determining whether a sharpness measure associated with each of the detected faces satisfies a sharpness threshold;

determining, for each of the one or more detected faces, whether the detected face is smiling and determining one or more quality scores for the one or more detected faces using the determined sharpness measures and the smiling determinations.

10. The method of claim 1, wherein generating a composite image that combines the multiple images comprises:

determining, for each of the detected faces that are determined to correspond to one or more people who are classified as important to the user, an image of the multiple images in which the face has a highest quality score; and generating the composite image based on combining an appearance of the detected faces in the images in which the detected faces have the highest quality score.

11. The method of claim 1, comprising:

providing a graphical user interface indicating the detected faces that are determined to correspond to the one or more people, in the set of people, who are classified as being important to the user.

12. The method of claim 1, comprising:

providing a graphical user interface indicating the detected faces (i) that are determined to correspond to the one or more people, in the set of people, who are classified as being important to the user and (ii) that none of the captured multiple images have at least the minimum quality score.

13. The method of claim 1, wherein the steps of (i) detecting one or more faces based on image data in a live image feed of a camera of a mobile device, (ii) determining that one or more of the detected faces correspond to one or more people, in a set of people, who are classified as being important to a user, and (iii) determining one or more quality scores for the one or more detected faces that are determined to correspond to one or more people who are classified as important to the user, occur prior to the user pressing a button or other control to initiate capture of a photograph.

14. A system comprising:

one or more computers and one or more storage devices storing instructions that are operable, when executed by the one or more computers, to cause the one or more computers to perform operations comprising:

determining frequencies that a user communicates with people;

detecting at least two faces based on image data in a live image feed of a camera of a mobile device;

determining that the at least two detected faces correspond to at least two people, in a set of people, who are classified as being important to a user;

in response to determining that at least two of the detected faces correspond to at least two people, in the set of people, who are classified as being important to the user based on the frequencies that the user communicates with people, determining one or more quality scores for the at least two detected faces that are determined to correspond to at least two people who are classified as important to the user;

capturing multiple images of the detected faces corresponding to the at least two people, in the set of people, who are classified as being important to the user with the camera based on the one or more quality scores, wherein the capturing is ended in response to determining, based on the one or more quality scores, that a face image having at least a minimum quality score has been captured for each of the people classified as being important; and generating a composite image that combines the multiple images of the detected faces corresponding to the at least two people, in the set of people, who are classified as being important to the user.

15. The system of claim 14, wherein capturing multiple images comprises:

determining that an image having at least the minimum quality score has not been captured for a particular identified face corresponding to a person who is classified as important to the user;

waiting until the quality score for the particular identified face in a live image feed of a camera satisfies a threshold prior to capturing an additional image of the particular identified face; and capturing an additional image for the particular identified face in response to determining that the quality score for the particular identified face in the live image feed of the camera satisfies the threshold.

16. The system of claim 14, wherein each of the multiple images is captured in response to determining that at least one of the detected faces has a quality score that satisfies a threshold.

17. The system of claim 14, wherein capturing multiple images with the camera based on the one or more quality scores comprises:

stopping image capture before the captured images include a face image having at least the minimum quality score for all people in view of the camera.

18. The system of claim 14, wherein determining that one or more of the detected faces correspond to one or more people, in a set of people, who are classified as being important to a user comprises:
obtaining data indicating facial features of people, in the set of people, who are classified as being important to the user; and
determining that the facial features of the one or more people in the set of people match facial features of the one or more detected faces.

19. A non-transitory computer-readable storage device encoded with a computer program, the program comprising instructions that when executed by one or more computers cause the one or more computers to perform operations comprising:
determining frequencies that a user communicates with people;
detecting at least two faces based on image data in a live image feed of a camera of a mobile device;
determining that at least two the detected faces correspond to at least two people, in a set of people, who are classified as being important to a user;
in response to determining that at least two of the detected faces correspond to at least two people, in the set of people, who are classified as being important to the user based on the frequencies that the user communicates with people, determining one or more quality scores for the at least two detected faces that are determined to correspond to at least two people who are classified as important to the user;
capturing multiple images of the detected faces corresponding to at least two people, in the set of people, who are classified as being important to the user with the camera based on the one or more quality scores, wherein the capturing is ended in response to determining, based on the one or more quality scores, that a face image having at least a minimum quality score has been captured for each of the people classified as being important; and
generating a composite image that combines the multiple images of the detected faces corresponding to the at least two people, in the set of people, who are classified as being important to the user.

* * * * *